United States Patent [19]

Eichenauer et al.

[11] Patent Number: 4,968,750

[45] Date of Patent: Nov. 6, 1990

[54] BLOCK COPOLYMERS CONTAINING POLYSILOXANE SEGMENTS

[75] Inventors: Herbert Eichenauer, Dormagen; Christian Lindner, Cologne; Karl-Heinz Ott, Leverkusen, all of Fed. Rep. of Germany

[73] Assignee: Bayer Aktiengesellschaft, Leverkusen, Fed. Rep. of Germany

[21] Appl. No.: 427,935

[22] Filed: Oct. 25, 1989

Related U.S. Application Data

[63] Continuation of Ser. No. 166,764, Mar. 3, 1988, abandoned, which is a continuation of Ser. No. 17,979, Feb. 24, 1987, abandoned.

[30] Foreign Application Priority Data

Mar. 4, 1986 [DE] Fed. Rep. of Germany ....... 3606983
Mar. 4, 1986 [DE] Fed. Rep. of Germany ....... 3606984

[51] Int. Cl.$^5$ .............................................. C08F 8/00
[52] U.S. Cl. .................................... 525/100; 525/101; 525/102; 525/106; 525/479; 525/25; 525/26; 525/29

[58] Field of Search ............... 525/100, 102, 106, 101, 525/479; 528/25, 26, 29

[56] References Cited

U.S. PATENT DOCUMENTS

| | | | |
|---|---|---|---|
| 3,760,030 | 9/1973 | Dean .................................... | 525/106 |
| 3,890,405 | 6/1975 | Kendrick et al. .................... | 525/106 |
| 4,328,323 | 5/1982 | Keogh ................................. | 525/106 |
| 4,369,289 | 1/1983 | Keogh ................................. | 525/106 |
| 4,552,941 | 11/1985 | Keogh ................................. | 528/16 |
| 4,565,846 | 1/1986 | Saito et al. ......................... | 525/106 |
| 4,769,417 | 9/1988 | Eichenauer et al. ................ | 525/101 |

OTHER PUBLICATIONS

Bill Meyer, Jr., Textbook of Polymer Science, (Wiley-Interscience, New York), 1971, pp. 65 and 78.

*Primary Examiner*—Melvyn I. Marquis
*Attorney, Agent, or Firm*—Connolly and Hutz

[57] ABSTRACT

Block copolymers composed of recurrent structural units belonging to the series comprising polysiloxanes and recurring structural units belonging to the series comprising homopolymers, copolymers or terpolymers of vinyl-aromatic compounds and acrylic monomers of mixtures thereof.

3 Claims, No Drawings

BLOCK COPOLYMERS CONTAINING POLYSILOXANE SEGMENTS

This is a continuation of application Ser. No. 166,764 filed Mar. 3, 1988 now abandoned which is a continuation of application Ser. No. 017,979 filed Feb. 24, 1987 now abandoned.

The invention relates to new block copolymers composed of recurring structural units belonging to the series comprising polysiloxanes and recurring structural units belonging to the series comprising homopolymers, copolymers or terpolymers of vinyl-aromatic compounds and acrylic monomers or mixtures thereof.

Various block copolymers are known, for example styrene/butadiene block copolymers, block copolymers formed from aliphatic polyesters or polyethers and polyesters of aromatic dicarboxylic acids or block copolymers based on aromatic polycarbonates.

Block copolymers in which the polymer blocks are composed of polysiloxane units and of units obtained by free-radical polymerization are novel.

It has been found that polymers composed of blocks based on polysiloxane and segments derived from homopolymers, copolymers or terpolymers or vinyl-aromatic compounds and acrylic compounds or mixtures thereof possess interesting properties, for example good flexibility, especially at low temperatures.

The invention relates to polymers having a block-like structure and composed of structural units (I)

$$\{A\} \quad (I)$$

and structural units (II) and/or (III)

$$\{B\} \quad (II)$$

$$\{\overline{B}\} \quad (III)$$

wherein the polymers have average molecular weights ($M_w$) of 2,000 to 500,000, preferably 5,000 to 250,000, characterized in that A represents a bifunctional polysiloxane segment of the formula (IV) or IVa $$+R^1R^2SiO+_x \quad (IV)$$

$$-\left[\begin{array}{c} N-Y-O+(R^1)(R^2)SiO+_{\overline{x}}Y-N \\ | \quad\quad\quad\quad\quad\quad\quad\quad\quad\quad\quad | \\ H \quad\quad\quad\quad\quad\quad\quad\quad\quad\quad\quad H \end{array}\right]- \quad (IVa)$$

in which
$R^1$ and $R^2$ are independently aryl or alkyl and
Y is a linear or branched $C_2$–$C_{10}$-alkylene group,
x represents a number such that segment (IV) or (IVa) has molecular weights ($M_w$) of >500, preferably >750, and
—B or respectively —$\overline{B}$— represent monofunctional, respectively bifunctional homopolymer and/or copolymer and/or terpolymer segments based on monovinyl-aromatic compounds and acrylic compounds or mixtures thereof, these segments having molecular weights ($M_w$) >800, preferably >1000.

The segments —B or —$\overline{B}$— of the block copolymers according to the invention are made from monomers which have been polymerized by free radical mechanisms in the presence of mercaptans containing hydroxyl groups or carboxyl groups and are selected from vinyl-aromatic compounds, such as, for example, styrene, α-methylstyrene, p-methylstyrene, vinyltoluene and halogenostyrenes, and from acrylic monomers, such as, for example, (methy)acrylonitrile or (meth)acrylic acid esters having 1–12 C atoms in the alcohol component, for example methyl methacrylate or n-butylacrylate, or of mixtures of both types of monomer.

Polymers formed from styrene, α-methylstyrene, acrylonitrile, methyl methacrylate or mixtures thereof and polymerized in the presence of mercaptoethanol or mercaptoacetic acid or mercaptopropionic acid are particularly preferred.

The invention also relates to a process for the preparation of the block copolymers according to the invention, which is characterized in that a homopolymer and/or copolymer and/or terpolymer formed from vinyl-aromatic compounds and acrylic compounds or mixtures thereof having one or two terminal hydroxyl groups of the formula V or VI $$B-OH \quad (V)$$

$$HO-B-OH \quad (VI)$$

or having one or two terminal carboxyl groups of the formula (VII) or (VIII)

$$B-COOH \quad (VII)$$

$$HOOC-B-COOH \quad (VIII)$$

wherein B has the meaning given above, and a polysiloxane of the formula (IX) or (IXa)

$$R^3COO+R^1R^2SiO+_{\overline{x}}COOR^3 \quad (IX)$$

$$H_2N-Y-O+(R^1)(R^2)SiO+_{\overline{x}}Y-NH_2 \quad (IXa)$$

in which
$R^1$, $R^2$ independently=aryl (in particular phenyl) or alkyl (in particular methyl),
Y=a linear or branched $C_2$–$C_{10}$-alkylene group
$R^3$=$C_1$–$C_{18}$Alkyl and
x=an integer,
are subjected to polycondensation with the elimination of water respectively of the acid $R^3COOH$, if appropriate by catalysis or by means of dehydrating agents or respectively of acid binding agents, the polymer (V) or (VI) or (VII) or (VIII) having an average molecular weight ($M_w$) of 800 to 20,000, preferably 1,500 to 15,000, and the polysiloxane (IX) respectively (IXa) having an average molecular weight ($M_w$) of 500 to 20,000. Polysiloxanes present in the block copolymers are polydialkylsiloxanes, polydiarylsiloxanes or polyarylalkylsiloxanes, in particular polydimethylsiloxane or polymethylphenylsiloxane radicals. They have block molecular weights of 500 to 20,000, in particular 800 to 15,000, and they are substantially linear. The preparation of the polysiloxanes (IX) and (IXa) is known, for example by ring-opening of cyclic siloxanes by anhydrides of carboxylic acids in the presence of catalysts ($FeCl_3$, $ZnCl_2$, borontriacetate) followed by a reaction with hydroxyamines (see S. N. Borisov and N. G. Sviridova, Journal of Organometallic Chemistry 11 (1968), 27–33 or British Patent No. 899,939)

The polymer segments forming the blocks B are derived from polymers formed from vinyl-aromatic compounds (in particular styrene or α-methylstyrene) or acrylic compounds (in particular (meth)acrylonitrile or methyl methacrylate) or mixtures thereof.

They are prepared by free-radical polymerization of these monomers in the presence of amounts, suitable for obtaining the desired molecular weight, or mercaptans containing hydroxyl groups or carboxylic groups. Examples of such compounds are mercaptoethanol ($HO-CH_2CH_2-SH$), mercaptopropanol, mercaptobutanol, mercaptophenol, mercaptoacetic acid, mercaptopropionic acid and mercaptobutyric acid.

The preparation of the polymer segments which result in the blocks B can be carried out by the known processes of free-radical polymerization, for example in bulk, in solution, in emulsion or in suspension or by a combination of these processes; suitable free radical-forming initiators are organic and inorganic peroxides, such as, for example, benzoyl peroxide, cumenehydroperoxide, anorganic peroxides, such as, for example potassiumperoxide or hydrogenperoxide, inorganic persulphates, such as, for example, potassium persulphate, azo initiators, such as, for example, azobisisobutyronitrile, and redox systems consisting of an oxidizing agent, preferably a peroxide, and a reducing agent. In this process it is also possible to employ suitable initiators of such a kind that a terminal hydroxyl group or a terminal carboxyl group can be introduced into the polymer chain by their agency.

The polymerization reaction can be carried out within a wide range of temperature; it is preferably carried out between 30° and 100° C., particularly preferably between 50° and 80° C.

The block copolymers according to the invention can be prepared by subjecting bisacylated polysiloxanes of the formula (IX) or polysiloxanes having terminal amino groups of the formula (IXa) to a polycondensation reaction with homopolymers and/or copolymers and/or terpolymers formed vinyl-aromatic compounds or acrylic compounds or mixtures thereof having one or two terminal hydroxyl groups of the formula (V) or (VI) or having one or two terminal carboxyl groups of the formula (VII) or (VIII). Normally, the starting components of the formulae (V) or (VI) and (IX) or (VII) or (VIII) and (IXa) are employed in equimolar amounts, but it can also be advantageous to employ one component or the other in a slight excess. It is then possible to controll the final molecular weight in an improved manner and to fix the nature of the end groups. The molecular weight can be fixed at the stage of the synthesis by using molecular weight regulators, for example monofunctional compounds such as monoalcohols, monoacylated polysiloxanes, anhydrides, esters and acid chlorides.

The synthesis of the block copolymers can be carried out at temperatures from 40° to about 200° C., in particular at 80° to 150° C. This reaction can be carried out with or without a solvent, for example with aromatic hydrocarbons, paraffins, chlorinated hydrocarbons, liquid amides, esters ketones or ethers.

In a preferred embodiment of the process, the latter is begun in the absence of solvent and solvent is added at the end of the polycondensation reaction.

When using polysiloxanes of formula IX there are preferably used catalysts and/or acid-biding agents, for example, organic or inorganic bases, such as salts (carbonates of alkali or alkaline earth metals) or soluble organic bases, such as tertiary amines, and also phase transfer catalysts, phosphines and Lewis bases are suitable. Under certain circumstances, at certain reaction temperatures, it is also advantageous to carry out the reaction in the presence of catalytic amounts of strong acids, especially if the polymerization is carried out with the acids formed being distilled off.

Using polysiloxanes of formula (IXa), it is preferable to carry out the polycondensation reaction using catalysts and/or dehydrating agents. Under certain circumstances and at certain reaction temperatures, it is also advantageous to carry out the reaction in the presence of catalytic amounts of strong acids.

The synthesis can be carried out discontinuously or continuously and can also be carried out in kneading units or screw extruder units.

It is also advantageous initially to take the entire amount of the starting substance (V) and/or (VI) or (IX) respectively (VII) and/or (VIII) or (IXa) and—depending on the progress of the reaction—to meter in the remaining amount of the other starting component (IX) and/or (V) and/or (VI) respectively (IXa) and/or (VII) and/or (VIII), respectively.

After the synthesis, the block copolymers can be isolated, if appropriate by evaporating off the auxiliary solvents or filtering off the dehydrating agents, and can be stabilized by means of customary antioxidants or light stabilizers.

The block copolymers according to the invention possess good mechanical properties, in particular at low temperatures, and a good resistance to chemicals and solvents and are suitable, if desired as a mixture with other polymers, for processing by thermoplastic means.

EXAMPLES

EXAMPLE 1

70.56 parts by weight of styrene, 27.44 parts by weight of acrylonitrile, 2 parts by weight of mercaptoacetic acid and 3 parts by weight of tert.-butyl perpivalate are dissolved in 500 ml of ethylbenzene and heated at 70° C. for 7 hours. After the solvent has been removed and the residue dried, a polymer is obtained (yield 82%) which has a sulphur content of 0.80% by weight and an intrinsic viscosity of 13.5 ml/g (in dimethylformamide at 25° C.).

EXAMPLE 2

63.05 parts by weight of styrene, 14.55 parts by weight of acrylonitrile, 19.40 parts by weight of methyl methacrylate, 3 parts by weight of 3-mercaptopropionic acid and 3 parts by weight of tert.-butyl perpivalate are dissolved in 450 ml of ethylbenzene and heated at 70° C. for 7 hours. After the solvent has been removed and the residue dried, a polymer is obtained (yield 85%) which has a sulphur content of 0.85% by weight and an intrinsic viscosity of 7.8 ml/g (in dimethylformamide at 25° C.).

EXAMPLE 3

920 parts by weight of the polymer from Example 1, 350 parts by weight of a polydimethylsiloxane having terminal $-CH(CH_3)-CH_2-NH_2$ groupings and a molecular weight of 3500 (determined by determination of amino end groups) and 1000 parts by weight of toluene are mixed and heated at 110°-120° C. for 1 hour. The solvent is then removed by distillation and the reaction mixture is heated at 150° C. in vacuo for a further 6 hours. The resulting product has an intrinsic viscosity of 21.5 ml/g (in chlorobenzene at 25° C.).

EXAMPLE 4

Example 3 is repeated, retaining the amount of polydimethylsiloxane and toluene, but employing 840 parts of the polymer from Example 2. This gives a product having an intrinsic viscosity of 18 ml/g (in chlorobenzene at 25° C.).

EXAMPLE 5

70.56 parts by weight of styrene, 27.44 parts by weight of acrylonitrile, 2 parts by weight of mercaptoethanol and 3 parts by weight of tert.-butyl perpivalate are dissolved in 280 ml of ethylbenzene and the mixture is heated at 70° C. for 7 hours. After the solvent has been removed and the residue has been dried, a polymer (yield 88%) with a sulphur content of 0.90% by weight and a limiting viscosity of 12 ml/g (in dimethylformamide at 25° C.) is obtained.

EXAMPLE 6

49 parts by weight of styrene, 49 parts by weight of methyl methacrylate, 2 parts by weight of mercaptoethanol and 3 parts by weight of tert.-butyl perpivalate are dissolved in 300 ml of ethylbenzene and the mixture is heated at 70° C. for 7 hours. After the solvent has been removed and the residue has been dried, a polymer (yield 85%) with a sulphur content of 0.85% by weight and a limiting viscosity of 8.5 ml/g (in dimethylformamide at 25° C.) is obtained.

EXAMPLE 7

760 parts by weight of the polymer from Example 5, 400 parts by weight of an α,ω-bis-acetylated polydimethylsiloxane with a molecular weight of 4,000 (determined by acetyl determination), 50 parts by weight of $Na_2CO_3$ and 3,000 parts by weight of toluene are reacted at 110°-120° C. for 5 hours. Thereafter, the mixture is cooled and filtered and the solvent is distilled off. The resulting product has a limiting viscosity of 21 ml/g (in chlorobenzene at 25° C.).

EXAMPLE 8

Example 7 is repeated, the amounts of α,ω-bis-acetylated polydimethylsiloxane, $Na_2CO_3$ and toluene being retained and 800 parts by weight of the polymer from Example 6 being employed. The resulting product has a limiting viscosity of 17.5 ml/g (in chlorobenzene at 25° C.).

We claim:

1. Process for the preparation of polymers having a block structure and comprising structural units (I)

   (I)

and structural units (II) or (III) or both

   (II)

   (III)

said polymers having weight average molecular weights ($M_w$) of 2,000 to 500,000 wherein A represents a bifunctional polysiloxane segment of the formula (IV) or (IVa)

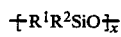   (IV)

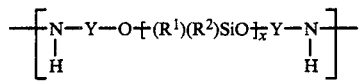   (IVa)

in which

R$^1$ and R$^2$ independently are each aryl or alkyl and

Y is a linear or branched $C_2-C_{10}$-alkylene groups, and x represents a number such that segment (IV) or (IVa) has weight average molecular weights ($M_w$) of >500, and B represents a copolymer segment which is styrene copolymerized with acrylonitrile or methyl methacrylate or both in the presence of meracaptoethanal, mercaptoacetic acid, or mercaptopropionic acid, and having a weight average molecular weight ($M_w$) of >800, said process comprising polycondensing B-containing copolymers having terminal hydroxyl groups (V) or (VI) or having terminal carboxyl groups (VII) or (VIII)

B—OH   (V)

HO—B—OH   (VI)

B—COOH   (VII)

HOOC—B—COOH   (VIII)

with a polysiloxane of the formula (IX) or (IXa)

R$^3$COO—R$^1$R$^2$SiO]$_x$COOR$^3$   (IX)

R$^3$ is $C_1-C_{18}$ alkyl

H$_2$N—Y—O—(R$^1$)(R$^2$)SiO]$_x$Y—NH$_2$   (IXa)

2. Process according to claim 1 wherein compounds (V), (VI), (VII) and (VIII) have average molecular weights from 800 to 20,000 and compounds (IX) and (IXa) have average molecular weights from 500 to 20,000.

3. Polymers having a block structure and structural units (I)

   (I)

and structural units (II) or (III) or both

   (II)

   (III)

said polymers having weight average molecular weights ($M_w$) of 2,000 to 500,000 wherein A represents a bifunctional polysiloxane segment of the formula (IV) or (IVa)

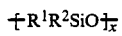   (IV)

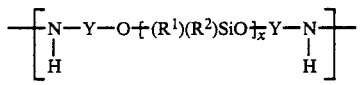   (IVa)

in which

R$^1$ and R$^2$ independently are each aryl or alkyl and

Y is a linear or branched $C_2-C_{10}$-alkylene groups, and x represents a number such that segment (IV) or (IVa) has weight average molecular weights ($M_w$) of >500, and B represents a copolymer segment which is styrene copolymerized with acrylonitrile or methyl methacrylate or both in the presence of meracaptoethanal, mercaptoacetic acid, or mercaptopropionic acid, and having a weight average molecular weight ($M_w$) of >800.

* * * * *